Patented Sept. 8, 1953

2,651,617

UNITED STATES PATENT OFFICE 2,651,617

TREATMENT OF ALUMINA CONTAINING CATALYTIC COMPOSITES

Louis Schmerling, Riverside, Ill., assignor to Universal Oil Products Company, Chicago, Ill., a corporation of Delaware No Drawing. Application April 16, 1949, Serial No. 88,053

9 Claims. (Cl. 252—413)

This invention relates to the treatment of alumina-containing composites for the purpose of enhancing the catalytic properties thereof in hydrocarbon conversion reactions effected in the presence of such composites. More specifically, the invention concerns the treatment of such catalysts with an acidic reagent at specified conditions to form thereby a resulting composite having greater activity and/or a reduced tendency to form undesirable by-products as characteristic of the initial, untreated composite.

It is widely recognized that certain essentially mineral composites containing alumina, such as the various clays and synthetic composites of alumina and silica or alumina and other refractory metal oxides are catalytically active in promoting certain hydrocarbon conversion reactions, as for example, the catalytic cracking of petroleum fractions to form hydrocarbons of lower molecular weight boiling in the gasoline range, the polymerization of aliphatic unsaturated hydrocarbons to convert highly volatile charging stocks to hydrocarbons that are liquid at normal conditions, etc. It is further recognized that upon continued use of such alumina-containing composites, their activity generally declines and the partially inactivated catalysts foster side reactions, many of which are considered undesirable in that they result in the production of materials having a lesser degree of utility than the desired product. As a typical example, the continued use of silica-alumina composites of either synthetic or natural origin in hydrocarbon cracking processes gradually reduces the activity of the catalyst for effecting the desired production of gasoline boiling range hydrocarbons as the result of carbon deposition on the catalyst and usually the undesirable production of methane, carbon and hydrogen simultaneously increases due to deep-seated cracking reactions, thus accounting for a two-fold reduction in yield of the desired gasoline product by virtue of the lower yield per pass and greater consumption of the charging stock to form the undesired carbon, hydrogen and methane products. Furthermore, the ratio of hydrogen to methane produced increases as the catalyst decreases in activity. Likewise, in many instances, a freshly prepared catalyst composite may result in excessive production of the undesired hydrocarbon degradation products either because of the presence of foreign constituents in the composite, or because of its inherent properties. One of the primary objects of the present process is to effect improvement in the catalytic properties of an alumina-containing composite, particularly for hydrocarbon conversion reactions.

Another object of the invention is to provide a method of treating alumina-containing catalytic composites to reduce their tendency to form undesirable by-products of hydrocarbon conversion reactions. Still another object of the invention is to provide a method for reactivating a spent hydrocarbon conversion catalyst or to activate an otherwise relatively inactive composite.

In one of its embodiments, the present invention concerns a process which comprises treating an alumina-containing composite with a reagent comprising an organic acid having a dissociation constant less than $1 \times 10^{-3}$ at reaction conditions sufficient to convert at least a portion of the alumina contained in said composite to a basic aluminum salt of said acid and, thereafter treating the composite with water at conditions sufficient to effect hydrolysis of the resulting aluminum salt.

In accordance with another embodiment of the invention, a process for activating an alumina-metal oxide composite catalyst is provided which comprises treating the catalyst with an aqueous organic acid containing at least 60% by weight of acid, said acid having a dissociation constant of less than $1 \times 10^{-3}$, at a temperature of from about 150° to about 300° C. and at a pressure sufficient to maintain said acid in substantially liquid phase, and thereafter reacting the resulting treated catalyst composite with water at a temperature above about 100° C. and at a pressure sufficient to maintain said water in substantially liquid phase.

A more specific embodiment of the invention relates to a process for reactivating a spent silica-alumina cracking catalyst which comprises heating said spent catalyst with an acid containing a major proportion of acetic acid and a minor proportion of hydrochloric acid at a temperature of from about 200° to about 250° C., recovering the resulting treated catalyst, reacting said treated catalyst with water at a temperature in excess of about 150° C. and at a pressure sufficient to maintain said water in substantially liquid phase, thereafter drying said catalyst and heating the same at a temperature of from about 350° to about 850° C.

Other objects and embodiments of the present process concerning specific factors involved in the invention will be hereinafter referred to in greater detail in the following further description of the invention.

The alumina-containing composites which are advantageously treated in the present process to enhance the catalytic properties in typical hydrocarbon conversion processes may be selected from the relatively large number of said composites of either natural (mineral) or synthetic origin. For example, the material selected for treatment may be a natural clay containing alumina in any proportion, such as bauxite (nearly pure alumina) montmorillonite, bentonite, etc., or a synthetically produced composite such as an alumina-silica, alumina-chromia, alumina-zirconia, or other of the many alumina-metal oxide composites commonly employed as catalysts for specific hydrocarbon conversion reactions. Aside from its use in activating the alumina-containing composite for catalytic hydrocarbon conversion reactions, the present acidic reagent may also be utilized for the purpose of modifying the physical properties of the composite to be treated, such as reducing its density by removal of a portion of the alumina contained in the original composite to provide a porous particle. The composite as originally formed in many instances may contain foreign components, such as one or more metallic oxides which may adversely affect the catalytic properties for which the catalyst may be initially intended and which are desirably removed to provide a catalyst possessing optimum catalytic properties. Typical instances of such materials are catalytic composites prepared from impure alumina ores which may contain such foreign components as the oxides or salts of calcium, sodium, iron, or other metals. In the case of such composites, the method of treatment provided herein may be applied for the specific purpose of removing the foreign components while concurrently enhancing the catalytic properties of the composite or modifying its physical properties.

A class of alumina-containing composites, especially adapted for treatment by the present process, comprises spent alumina-containing catalysts which have become deactivated by continuous use of the catalyst in a hydrocarbon conversion process. The present treatment which includes heating the composite in the presence of an organic acid having a dissociation constant less than $1 \times 10^{-3}$, presumably converts the alumina in contact with the reagent to a salt of the acid (at the temperature conditions and utilizing the concentration of acid herein specified) and the subsequent hydrolytic treatment of the acid-treated composite with water at a relatively high temperature hydrolyzes the aluminum salt to form a porous, reactivated form of aluminum oxide, primarily on the surface of the particle which will subsequently come into contact with the hydrocarbon charging stock in the conversion process involving the catalyst. The calcination of the treated composite serves to fix the reactivated alumina to the body of the particle and/or bring it into chemical association with other components of the catalytic composite. When utilizing a deactivated catalyst as the material subjected to treatment herein, it is desirable to remove as much as possible of the carbonaceous material, if any, deposited thereon prior to the present treatment, as for example, by heating the deactivated composite in an oxygen-containing atmosphere and at a temperature sufficient to oxidize the deposit from the catalyst. It is frequently noted in carrying out such a procedure that the treated catalyst may exhibit an activity greater than the original catalyst prior to use and/or may have other advantageous properties, such as a lower density, developed by the present method of treatment.

The acid treating reagent of the present process is an organic acid capable of reacting with alumina to form a basic salt of aluminum at the reaction conditions provided herein or a mixture of such acid with a mineral acid containing a minor amount of the latter acid. The organic acid is utilized in a relatively concentrated form, containing at least 60 percent by weight of the acid, and when utilized in the treating reagent, the mineral acid is preferably present therein in amounts up to about 10% by weight thereof and preferably as the concentrated acid. Suitable organic acids utilizable in the treating agent include the mono-, and dicarboxylic acids such as acetic acid, propionic acid, succinic acid, tartaric acid and others. Acids of the fatty acid series having ionization constants less than $1 \times 10^{-3}$ are preferred, formic and acetic acids being especially preferred in the treatment of alumina-containing composites by means of the present invention. Acids having higher dissociation constants including such mineral acids as hydrochloric, sulfuric, phosphoric, and hydrobromic acid and such organic acids as mono-, di- and trichloroacetic acids, oxalic acid, etc. may be added to the weaker organic acid forming the basic aluminum acid salt thereof in amounts up to about 10% by weight thereof, preferably up to about 5% by weight, particularly when the acid treating reagent is utilized to effect reactivation of spent alumina-containing catalyst composites. These mineral and strong organic acids are not equivalent in their effectiveness, and hydrochloric acid is usually preferred. The amount of the alumina component removed from the alumina-containing composite depends upon the period of treatment and is directly correlated with the concentration and amount of the mineral acid or strong organic acid contained in the acidic reagent; the reagent is therefore prepared with such factor in consideration, depending upon the amount of alumina it is desired to remove from the catalyst composite subjected to treatment.

In accordance with the present process, the alumina-containing composite is treated with the acidic reagent at temperatures of from about 150° to about 300° C., preferably from about 180° to about 250° C. to effect the formation of the aluminum salt of the organic acid component of the treating reagent. At these temperatures, the pressure is maintained sufficiently superatmospheric to provide essentially liquid phase conditions in the reactor. The treatment of the composite at these conditions with the acid treating reagent results in the formation of an aluminum salt of the acid or acids utilized in the reagent. The treatment may also convert certain foreign components of the catalytic composite, such as the oxides of iron, calcium, sodium, etc., to soluble salts which are removed by draining the excess of the acidic reagent from the treated catalyst composite following the treatment. The aluminum salt of the organic acid, however, is substantially insoluble in the organic acid treating reagent and is thus left in the body of the catalyst particle. Following the initial treatment with the acidic reagent, the excess of the latter may be withdrawn from the reaction mixture or water may be added directly thereto without withdrawing the excess of the reagent. It is generally preferred, however, to remove the excess reagent and add water to the treated catalyst composite for the subsequent hydrolytic treatment. Hydrolysis of the organic aluminum salt retained on the catalyst particle is effected by heating the treated catalyst with water at a temperature above about 100° C., preferably from about 150° to about 250° C., preferably maintaining superatmospheric pressure in the hydrolytic reactor for the purpose of maintaining the water in substantially liquid phase. The hydrolyzed product is thereafter removed, for example, by filtration or decantation, and dried to form one modification of the final catalyst product. The acid treated catalyst may alternatively be heated to the indicated temperatures by passing superheated steam over the particles or by pressurizing the same with steam in a pressure autoclave.

Following the hydrolytic stage of the present treatment, the dried treated catalyst composites may be calcined at temperatures of from about 350° to about 850° C., depending upon the particular hydrocarbon conversion process in which the catalyst composite is utilized. Calcination of the treated catalyst is generally employed for activating alumina-silica, alumina-zirconia, and other catalyst composites to develop optimum activity for their subsequent use in hydrocarbon conversion reactions.

The present invention will be described in greater detail with reference to specific embodiments of the invention in the following examples, although these are not intended to limit the generally broad scope of the invention in strict accordance therewith.

EXAMPLE I

The following experiment was run to indicate that even a freshly prepared sample of silica-alumina catalyst may be improved by means of the present treatment. In this experiment, a sample of silica-alumina catalyst containing approximately 11.1% alumina, prepared by precipitation of aluminum hydroxide on a silica-gel sphere followed by drying and calcination at approximately 550° C. was utilized. This catalyst has the following properties when subjected to the tests indicated.

TABLE I

*Freshly prepared silica-alumina catalyst*

| | |
|---|---|
| Average bulk density, grams/cc. | 0.59 |
| Volume percent activity [1] | 49 |
| Weight percent activity [1] | 42 |
| $H_2/CH_4$ [2] ratio produced on test in a standard cracking procedure | 2.0 |

[1] The ability of the catalyst to catalytically crack hydrocarbons is specified as its volume percent activity (when the volume of the converted product is considered as basis) or as its weight percent activity (when the weight of converted product is considered as basis). A Mid-Continent gas oil fraction having an API gravity of 31.4 and an initial boiling point of 465° F. was passed over a solid bed of the catalyst contained in a furnace maintained at a temperature of about 932° F. at a space velocity of said gas oil of approximately 4 volumes per volume of catalyst per hour. The liquid hydrocarbon product boiling at a temperature above about 400° F. was condensed in a receiver and the gaseous fraction together with the condensible gases boiling at a temperature below about 400° F. were collected in a separate receiver. Depending upon whether the volume or weight basis of computation is utilized the volume or weight of total product (consisting of 400° F. end-point gasoline plus uncondensed gas) divided by the amount of oil charged and the result multiplied by 100 provides a value designated as the respective weight percent or volume percent "activity" of the catalyst.
[2] The ratio of hydrogen to methane produced indicates the efficiency of the composite as a cracking catalyst, a high ratio of hydrogen indicating a great deal of undesirable dehydrogenation of the charging stock and a low ratio (high $CH_4$) indicating greater efficiency as a cracking catalyst.

The freshly prepared silica-alumina cracking catalyst was treated with glacial acetic acid in accordance with the following experiment. 75 grams of the catalyst was heated with 150 grams of the acetic acid at 200° C. for 6 hours in a rotating pressure autoclave followed by filtering the treated catalyst from the excess acid, washing with water and drying the treated composite at 145° C. for 3 hours. The treated catalyst had an average bulk density of 0.44, a volume percent activity of 36, a weight percent activity of 41, and when tested for its effectiveness in catalytically cracking a gas oil charging stock, the product contained a $H_2/CH_4$ ratio of 1.4.

A sample of the glacial acetic acid treated catalyst was subjected to hydrolysis by heating 40 grams of the catalyst with 150 grams of water at 180° C. for 6 hours in a rotating pressure autoclave, followed by drying the treated product at 145° C. The recovered catalyst has an average bulk density of 0.57, and when tested in accordance with a standard catalytic cracking procedure, has a volume percent activity of 53, a weight percent activity of 46, and the gaseous product contained a $H_2/CH_4$ ratio of 1.6.

The above results indicate that even in the case of a freshly prepared catalyst, the activity of the catalyst and its efficiency in yielding the desired cracked products is increased by the present acid treatment followed by the hydrolytic treatment. The results further indicate that the density of the catalyst may be reduced by the successive stages of treatment herein provided.

EXAMPLE II

A sample of spent silica-alumina cracking catalyst which had become deactivated by continued use in a hydrocarbon cracking reaction was treated in accordance with the present process in the following experiment. The spent catalyst, which was black, because of the deposition of carbon on its surface during its use as a cracking catalyst, had an average bulk density of 0.70, its weight percent activity was 23 and in testing its cracking ability by means of the standard procedure outlined in footnote (1) of Example I, was relatively low as indicated by a hydrogen to methane ratio of 4.6 in the products of the cracking test. The spent catalyst was treated with glacial acetic acid at 200° C. for 6 hours, followed by drying the treated catalyst separated from the excess of acetic acid. It had an average bulk density of 0.32, a weight percent activity of 31 and produced a product in which the hydrogen to methane ratio was 1.8. Hydrolytic treatment of the acid treated catalyst by heating the same with water at 180° C. for 6 hours yielded a catalyst having an average bulk density of 0.57, a weight percent activity of 32 and, when tested by means of the standard gas oil cracking test, produced a product in which the hydrogen to methane ratio was 3.4.

These results indicate that by means of the present method of treatment, the density of the spent silica-alumina cracking catalyst may be decreased, its weight percent activity markedly increased and its efficiency as a cracking catalyst greatly increased as indicated by the lower hydrogen to methane ratio in the products of the cracking reaction utilizing the treated catalyst as compared with the spent catalyst initially charged.

EXAMPLE III

The spent silica-alumina cracking catalyst of Example II having the same average bulk density, weight percent activity and cracking efficiency was treated in the following experiment with a mixture of acids consisting of a predominant proportion of glacial acidic acid and a minor proportion of concentrated hydrochloric acid. 75 grams of the catalyst was heated with a mixture containing 150 grams of glacial acetic acid and 5 grams of concentrated hydrochloric acid at 200° C. for 6 hours in a rotating pressure autoclave. The treated catalyst was filtered from the excess acidic reagent, washed with water and subsequently heated with 150 grams of water at 180° C. for 6 hours.

After drying the separated catalyst, it had an average bulk density of 0.50, a weight percent activity of 33 and in testing its cracking efficiency in the standard gas oil cracking test, the products therefrom contained a ratio of hydrogen to methane of 1.6 as compared to 4.6 for the spent catalyst prior to the instant treatment.

EXAMPLE IV

The spent silica-alumina cracking catalyst utilized in Example III and having the same cracking efficiency as indicated by the proportion of hydrogen to methane in the products recovered in a standard cracking test utilizing the catalyst, was treated with a mixture of dichloroacetic acid and glacial acetic acid in accordance with the following experiment. 75 grams of the spent catalyst was charged into a rotating pressure autoclave with 150 grams of glacial acetic acid and 15 grams of dichloroacetic acid wherein it was heated at 200° C. for 6 hours. The separated catalyst following the treatment, was washed with water and heated with 150 grams of water at 180° C. for 6 hours. The recovered catalyst dried at 145° C. for 3 hours, had an average bulk density of 0.52, a weight percent activity of 36 and when tested in accordance with the standard gas oil cracking test, produced a product containing a ratio of hydrogen to methane of 1.1, as compared to the same ratio for the spent untreated catalyst of 4.6.

I claim as my invention:

1. A process for improving the physical and catalytic properties of an alumina-containing mineral composite which comprises heating said composite with an acidic reagent containing a major proportion of an organic acid having a dissociation constant of less than $1 \times 10^{-3}$ at a temperature of from about 150° to about 300° C. under sufficient pressure to maintain said reagent in substantially liquid phase, said organic acid being of a concentration and amount sufficient to convert a substantial portion, at least, of the alumina into a basic aluminum salt of said acid, and thereafter treating the resulting composite with water at a temperature above 100° C. under sufficient pressure to maintain the water in substantially liquid phase whereby to hydrolyze said aluminum salt.

2. The process of claim 1 further characterized in that the said composite is a spent alumina-containing hydrocarbon conversion catalyst.

3. The process of claim 1 further characterized in that said acidic reagent comprises glacial acetic acid and up to 10% by weight of dichloroacetic acid.

4. The process of claim 1 further characterized in that said acidic reagent contains up to about 10% by weight of a mineral acid.

5. The process of claim 1 further characterized in that said acidic reagent comprises acetic acid containing at least 60% by weight of acetic acid.

6. The process of claim 1 further characterized in that said acidic reagent is a mixture of acetic acid and up to 10% by weight of hydrochloric acid.

7. The process of claim 1 further characterized in that said alumina-containing mineral composite is a silica-alumina composite.

8. The process of claim 1 further characterized in that said alumina-containing mineral composite is heated with said acidic reagent at a temperature of from about 180° to about 250° C.

9. The process of claim 1 further characterized in that said resulting composite following the treatment of the composite with the acidic reagent is heated with water at a temperature of from about 150° to about 250° C.

LOUIS SCHMERLING.

References Cited in the file of this patent

UNITED STATES PATENTS

| Number | Name | Date |
|---|---|---|
| 2,162,202 | Fuchs | June 13, 1939 |
| 2,180,576 | Baylis et al. | Nov. 21, 1939 |
| 2,246,900 | Schulze et al. | June 24, 1941 |
| 2,380,731 | Drake et al. | July 31, 1945 |
| 2,477,664 | Shaber | Aug. 2, 1949 |